Figure 4:
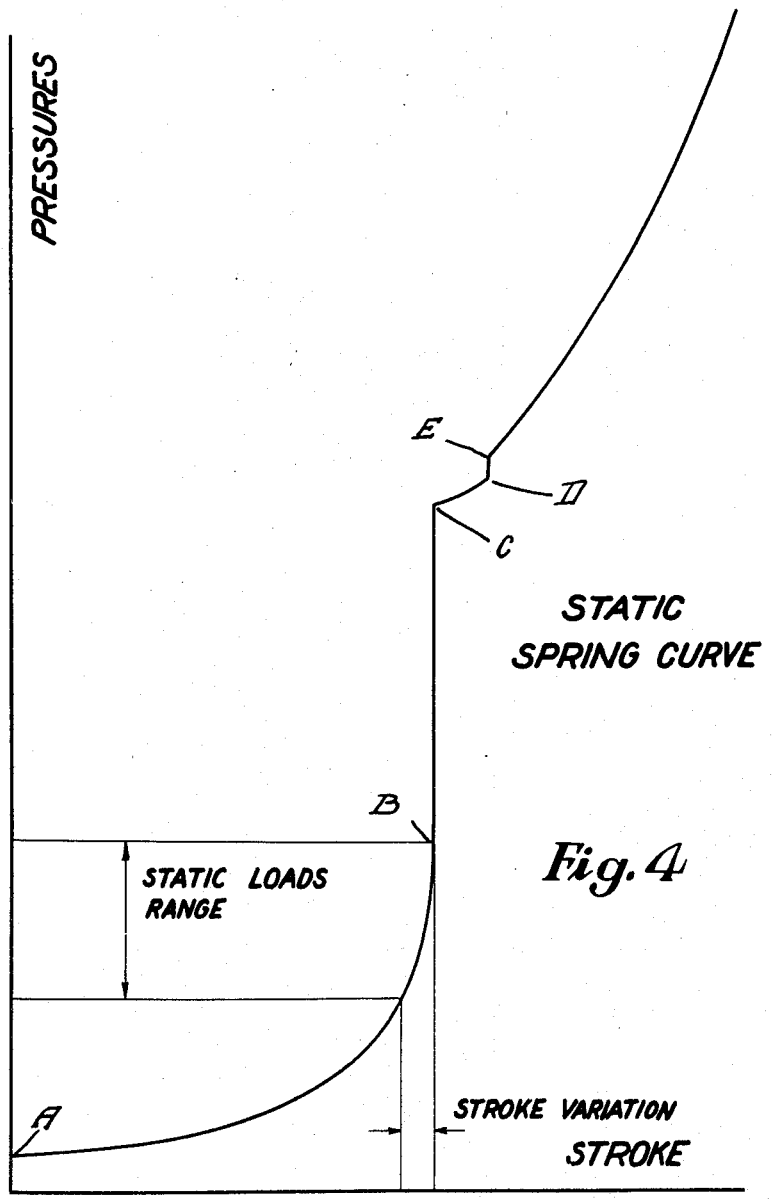

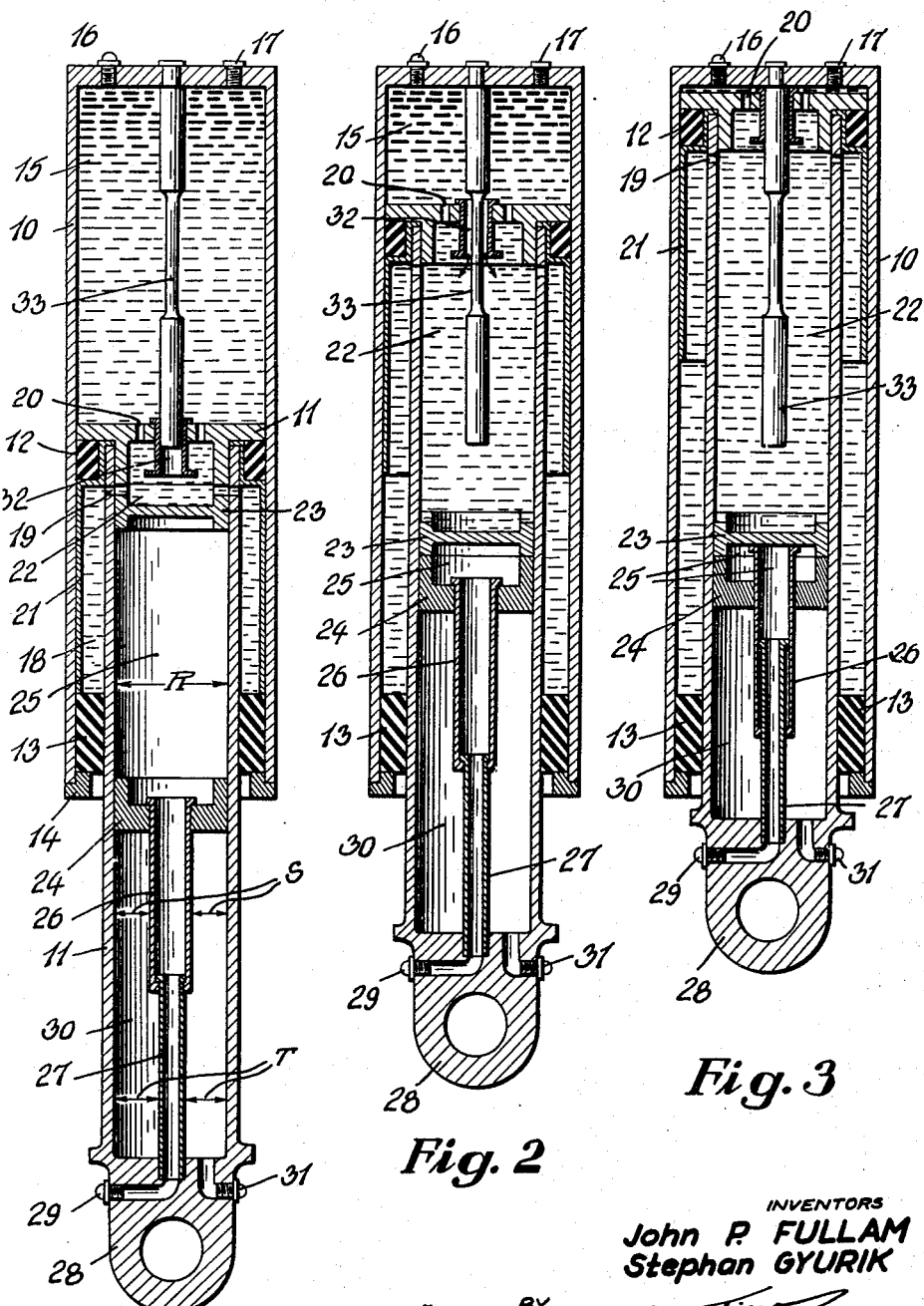

2,959,410

DOUBLE STAGE OLEO-PNEUMATIC SHOCK ABSORBER

John Peter Fullam, Baie D'Urfee, Quebec, and Stephan Gyurik, Montreal, Quebec, Canada, assignors to Jarry Hydraulics, Montreal, Quebec, Canada Filed Oct. 27, 1958, Ser. No. 769,901

5 Claims. (Cl. 267—64)

The present invention relates to a new type of shock-absorber particularly adapted for the recently developed aircrafts in the short take-off and landing (STOL) category. The invention is concerned with providing such characteristics as to prevent large changes in attitude of the aircraft for greatly different loading conditions and to prevent excessive pitching on the nose wheel when the brakes are applied on the main wheels of a tricycle type undercarriage.

These characteristics are achieved by providing a shock-absorber consisting primarily of two air chambers and one oil chamber, and by choosing the inflation pressures and compression ratios of the two air columns, so as to minimize the variations in shock-absorber closures over the whole range of static loads. The result aimed at, is to make the static range coincide with a steep intermediate part of the air spring curve, so that large variations of load will correspond to small variations of shock-absorber closures.

The particular structural features of the invention, which make possible the above results, will best be understood from the following description of one embodiment of the invention, given by way of example, and illustrated in the accompanying drawings, in which:

Figures 1, 2 and 3 show a shock-absorber at three decreasing states of closure, and Figure 4 is a diagram of a static spring curve.

Referring to Figures 1, 2 and 3, wherein like characters indicate the same elements throughout, the shock-absorber comprises an outer cylinder 10 and a piston 11 slidably mounted therein on an upper bearing 12 attached to the piston and on a lower bearing 13, held in the cylinder 11 by a bearing retainer 14. Piston 11 and cylinder 10 define an oil chamber 15 having a charging valve 16 and a bleeder plug 17 at the top of the cylinder. A second oil chamber 18 is defined by the space between the walls of the piston 11 and the cylinder 10. Chambers 15 and 18 communicate through fixed orifices 19 and 20 in the piston 11. A spacer 21 is provided in chamber 18 to limit the opening stroke of the piston, said spacer abutting against the lower bearing 13.

Piston 11 is hollow and the upper chamber 22 thereof provides communication between orifices 19 and 20. In the hollow interior of piston 11, there is provided a first stage floating piston 23, in contact with the oil in chamber 22 and a second stage floating piston 24. Pistons 23 and 24 define between themselves a first stage air chamber 25.

Floating piston 24 has a hole therein in which passes the outer member 26 of a telescoping stack tube, the inner member 27 of said stack tube being mounted to slide inside the outer member 26 and being fixed at its lower end to the bottom 28 of piston 11.

Air chamber 25 communicates through stack tube 26 and 27 with an air charging valve 29.

Floating piston 24 defines a second stage air chamber 30 not communicating with the first stage air chamber 25 and comprising an air charging valve 31.

The corresponding faces of pistons 23 and 24 are recessed, to limit the minimum volume of chamber 25 when the pistons 23 and 24 are in contact as shown in Figure 2.

The upper end of piston 11 has, besides the fixed orifices 20, a further orifice 32 in which is disposed a metering pin 33 of varying cross-section, fixed to the upper end of cylinder 10.

As shown in Fig. 2 due to the varying cross-section of metering pin 33, the relative position of pin 33 and orifice 32 determines the orifice area available to the oil flowing from chamber 15 to chamber 22 at different closure positions.

Rebound rings and flappers (not shown) may be provided in a conventional manner on orifices 19 and 20, to control rebound of the shock-absorber.

In operation, the first stage air chamber 25 is filled with air at low pressure through valve 29 and the second stage air chamber 30 is filled with high pressure air through valve 31. The operation of the shock-absorber will now be explained with reference to the static spring curve of Fig. 4. At the beginning of operation, chamber 25 is charged with air at a pressure $p$ while chamber 30 is charged with air at a pressure $q$. The initial pressures $p$ and $q$ are so chosen that if the maximum compression ratio of chamber 25 (including the interior of the stack tube) is $1/k$ then $pk<q$. The position of Fig. 1 corresponds to point A in the curve. As additional load is applied the piston 24 travels upwardly in chamber 25 until the piston 24 touches piston 23 (Fig. 2). At this point therefore the pressure $p$ in chamber 25 will reach a value which is still lower than that of pressure $q$ in chamber 30; to this point corresponds the point B of the curve. Further loading, therefore, will not result in any further stroke. This is shown in Fig. 4, by the no-stroke portion B—C of the curve. As soon as the load on the shock-absorber reaches the value $q$, piston 24 begins to travel downwardly into chamber 30 until the upper member 26 of the telescopic stack tube reaches piston 23. During this portion of curve C—D, D being the point at which contact takes place between member 26 and piston 23, the load will be balanced by a value $Sq+(R-S)p$ wherein R is the cross-sectional area of piston 23 or chamber 25, and S is the cross-sectional area of piston 24 exclusive of course of the cross-sectional area of the telescoping stack tube 26. At the point D namely when the member 26 comes in contact with piston 23, the pressure $q$ is still larger than the pressure $p$; any further load will have to be balanced by a value $Tq+(R-T)p$ wherein T is the cross-sectional area of the chamber 30 exclusive of the lower member 27 of the stack tube. Since at point D the pressure $p$ is still smaller than the pressure $q$ and the area T is larger than the area S, a load buildup must occur of magnitude $(T-S)(q-p)$; this value is the height of the step DE. From point E onward the further load will be balanced by value $Tq+(R-T)p$, and from point E onward the load of the shock-absorber will be continuously balanced until complete closure. As can be seen in Figure 4 the invention makes it possible to obtain a spring curve which is provided with a central steep portion; by suitably adjusting the pressures $p$ and $q$ in relation to the compression ratio $1/k$, as mentioned above, the static loads range can be made to coincide with the steep portion of the curve, as shown in Figure 4, so that in the range of static loads the stroke variation is kept at a minimum. While an embodiment of the invention has been illustrated and described it is understood that various modifications are encompassed by the spirit and scope of the appended claims.

We claim:

1. A shock absorber mounted between the sprung and unsprung portions of a vehicle, comprising an air cylinder, a first piston in said cylinder exposed to the load, a second piston freely floating in said cylinder, means limiting the position of said second piston, said first piston defining with said cylinder and said second piston a first air column of pressure A in the unstressed state of the shock absorber, said second piston defining with the cylinder a second air column of pressure B, the load on said shock absorber being operative to displace said first piston towards said second piston to compress said first air column, spacing means between said pistons limiting compression of said first air column to a ratio $1/C$ such that $AC<B$.

2. A shock absorber mounted between the sprung and unsprung portions of a vehicle, comprising an air cylinder, a first piston in said cylinder exposed to the load, a second piston freely floating in said cylinder, tensional means limiting the position of said second piston, said first piston defining with said cylinder and said second piston a first air column of pressure A, said second piston defining with said cylinder a second air column of pressure B, the load on said shock absorber being operative to displace said first piston towards said second piston to compress said first air column, spacing means between said pistons limiting the compression of said first air column to a ratio $1/C$ such that $AC<B$.

3. A shock absorber as claimed in claim 2, said tensional means comprising a telescopic stack tube also serving as an air charging conduit for said first air column.

4. A shock absorber mounted between the sprung and unsprung portions of a vehicle, comprising an air cylinder, a first piston in said cylinder exposed to the load, a second piston freely floating in said cylinder, means limiting the position of said second piston, said first piston defining with said cylinder and said second piston a first air column of pressure A, said second piston defining with the cylinder a second air column of pressure B, the load on said shock absorber being operative to displace said first piston towards said second piston, to compress said first air column, a recessed portion on at least one of said pistons on its side facing the other piston, said recessed portion, upon contact of said pistons, defining a chamber in volumetric ratio $1/C$ to said first air column when said shock absorber is unstressed, C being such that $AC<B$.

5. An oleo-pneumatic shock absorber comprising an oil cylinder, an air cylinder slidably mounted in said oil cylinder and having a piston actuated by the oil in said oil cylinder, a floating piston in said air cylinder, a telescopic stack tube attached to the closed end of said air cylinder and limiting the position of said floating piston, said floating piston defining with said oil actuated piston, a first air column, the interior of said stack tube communicating with said first air column, said floating piston defining with the closed end of said cylinder a second air column, not communicating with said first air column, means to charge said first air column through said stack tube to a pressure A, means to charge said second air column to a pressure B, recessed portions on facing sides of said pistons, said recessed portions, together with said stack tube, defining, upon contact of said pistons, a chamber in volumetric ratio of $1/C$ to said first air column when said shock absorber is unstressed, C being such that $AC<B$.

References Cited in the file of this patent

UNITED STATES PATENTS

| Re. 5,556 | Hope | Aug. 26, 1873 |
| 1,918,697 | Gruss | July 18, 1933 |
| 1,967,641 | Wallace | July 24, 1934 |
| 2,769,632 | Bourcier De Carbon | Nov. 6, 1956 |